United States Patent [19]

Ogawa

[11] Patent Number: 5,562,877
[45] Date of Patent: Oct. 8, 1996

[54] METHOD OF MANUFACTURING A FOAMED PLASTIC AND SUBSEQUENTLY POLYMERIZING THE FOAMING AGENT

[75] Inventor: Kazufumi Ogawa, Hirakata, Japan

[73] Assignee: Matsushita Electric Industrial Co., Ltd., Osaka, Japan

[21] Appl. No.: 485,236

[22] Filed: Jun. 7, 1995

Related U.S. Application Data

[62] Division of Ser. No. 913,727, Jul. 16, 1992, Pat. No. 5,461,083.

[30] Foreign Application Priority Data

Jul. 26, 1991 [JP] Japan .................................. 3-187696

[51] Int. Cl.$^6$ .................................................. B29C 44/06
[52] U.S. Cl. ............................ 264/424; 264/425; 264/53; 264/129
[58] Field of Search ................................ 264/22, 51, 53, 264/129, 424, 425; 427/124

[56] References Cited

U.S. PATENT DOCUMENTS

| | | |
|---|---|---|
| 3,723,318 | 3/1973 | Butler . |
| 4,038,350 | 7/1977 | Jaques ........................ 264/22 |
| 4,052,347 | 10/1977 | Dieterich et al. ................ 521/155 |
| 4,419,459 | 12/1983 | Melchior ........................ 521/54 |
| 4,530,806 | 7/1985 | Melchior ........................ 264/22 |
| 4,898,893 | 2/1990 | Ashida ........................ 521/139 |
| 5,137,929 | 8/1992 | Demmin et al. ................ 521/99 |
| 5,169,873 | 12/1992 | Behme et al. ................ 521/114 |

FOREIGN PATENT DOCUMENTS 914121161  6/1991  Germany .

OTHER PUBLICATIONS

Database WPIL (Derwent), accession No. 83–15929K(07), Derwent Publications Ltd., London, GB & JP–A–58 011 714 (Shinetsu Chem. Ind. K.K.) Jan. 7, 1983.

*Primary Examiner*—Allan R. Kuhns
*Attorney, Agent, or Firm*—Fish & Richardson, P.C.

[57] ABSTRACT

A foamed plastic manufactured by foaming a mixture of a resin and a volatile polymerizable foaming agent, wherein the pressure in the foams of the foamed plastic is less than atmospheric pressure, is disclosed. Further, a foamed plastic manufactured by hermetically sealing with an airtight film and foaming a mixture of a resin and a volatile polymerizable foaming agent, wherein the pressure in a gap region between the airtight film and the foamed plastic and the pressure in the foams of the foamed plastic are less than atmospheric pressure is disclosed. Further, a method of manufacturing foamed plastic comprising foaming a mixture of a volatile polymerizable foaming agent and a resin, and irradiating the foamed plastic with an energy beam. According to the invention, to enhance the heat insulation and soundproof performance a volatile liquid polymerizable monomer is used as foaming agent, and irradiated with an energy beam to polymerize the foaming agent after forming, and to maintained a reduced internal pressure, the foamed plastic is further covered by a metal film or laminated film.

3 Claims, 1 Drawing Sheet

5,562,877

METHOD OF MANUFACTURING A FOAMED PLASTIC AND SUBSEQUENTLY POLYMERIZING THE FOAMING AGENT

This application is a division of U.S. application Ser. No. 07/913,727, filed Jul. 16, 1992, now U.S. Pat. No. 5,461,083.

FIELD OF THE INVENTION

The present invention relates to foamed plastics useful as soundproof and heat insulting materials, and a method of manufacturing the same, and in particular to foamed plastics excellent in soundproof and heat insulating effects and a method of manufacturing the same.

BACKGROUND OF THE INVENTION

It has been hitherto known that properties such as heat insulation, sound absorption, buoyancy, elasticity and weight reduction are improved by mechanically foaming plastics, foaming by using reactive gas or foaming by using foaming agents, and such foamed plastics are widely used in the soundproof material, heat insulator, building material, lightweight structural material, packaging material, insulating material, cushion, material, quakeproof material, footwear, automobile interior, and others. Many usable resins are known, and various foaming techniques are also known.

Recently, in order to save energy, save resources and save space, it is desired to improve the heat insulation and soundproof performance with a material that is thin as possible.

To improve the heat insulation or soundproof performance per unit thickness, it is desirable to maintain a vacuum inside of the foamed plastics. In using a vacuum pump as generally known, it is impossible to maintain a vacuum individually in the foamed plastics, and the heat insulation and soundproof qualities are not satisfactory.

SUMMARY OF THE INVENTION

It is hence an object of the invention to solve the above-discussed problems of the prior art, by presenting foamed plastics enhanced in heat insulation and soundproof qualities and a method of manufacturing the same.

According to a first aspect of the invention, I provide a foamed plastic comprising many foams in the foamed resin, wherein the pressure in the foams is less than atmospheric pressure, and containing a polymerized volatile polymerizable foaming agent in the foams.

It is preferable in this invention that metal is deposited on the surface of the foamed plastic.

It is preferable in this invention that the foamed plastic comprises at least one resin selected from the group consisting of polystyrene resin, vinyl chloride resin, polyurethane resin, phenol resin, urea resin, epoxy resin, polyethylene resin, polypropylene resin, methacryl resin and silicone resin.

According to a second aspect of the invention, I provide a foamed plastic comprising a foamed resin covered with an airtight film, wherein the pressure in the foams and the pressure in a gap region between the airtight film and the foamed plastic is less than atmospheric pressure, and containing a polymerized volatile polymerizable foaming agent in the foams and gap region.

It is preferable in this invention that the airtight film is at least one film selected from the group consisting of polyvinylidene chloride, polyvinyl chloride, polyethylene, polypropylene, polybutadiene, nylon, polycarbonate, cellophane, polyvinyl alcohol, polyester, metal deposition resin film, and aluminum foil.

It is preferable in this invention that the foamed plastic comprise at least one resin selected from the group consisting of polystyrene resin, vinyl chloride resin, polyurethane resin, phenol resin, urea resin, epoxy resin, polyethylene resin, polypropylene resin, methacryl resin and silicone resin.

According to a third aspect of the invention, I provide a method of manufacturing a foamed plastic comprising foaming a mixture of a volatile polymerizable foaming agent and a resin, and irradiating the foamed plastic with an energy beam.

It is preferable in this invention that the foamed plastic is covered with a deposited metal on the surface of the foamed plastic.

It is preferable in this invention that the polymerizable foaming agent is a monomer possessing an unsaturated carbon bonding.

According to a fourth aspect of the invention, I provide a method of manufacturing foamed plastic comprising sealing a mixture of a resin and a volatile polymerizable foaming agent with an airtight film, foaming the mixture and irradiating the foamed mixture with an energy beam through the airtight film.

It is preferable in this invention that the the polymerizable foaming agent is a monomer possessing an unsaturated carbon bonding.

According to the first aspect of the invention, by polymerizing a foaming agent which is a volatile polymerizable monomer existing in the foams, the foaming agent is solidified, and the internal region of the foam or a gap region between the airtight film and the foamed plastic may be reduced in pressure from initially applying a vacuum. As a result, the foamed plastics can be realized which are improved in heat insulation and soundproof performance.

It is preferable in this invention wherein a metal is deposited or vaporized on to the surface of the foamed plastics, the internal foamed region or a gap region may be reduced in pressure from initially applying a vacuum.

According to the second aspect of the invention, the pressure in the internal region of the foams, and the pressure in the gap region between the airtight film and foamed plastic are keeped less than the atmospheric pressure for a longer period of time by covering the foamed plastic by the metal film or laminated film.

According to the first and second inventions in which the airtight film is at least single film or complex film selected from the group consisting of polyvinylidene chloride, polyvinyl chloride, polyethylene, polypropylene, nylon, polycarbonate, cellophane, polyvinyl alcohol, polyester, metal deposition resin film, and aluminum foil, the internal of the foam and the gap maybe maintained at reduced a pressure state that is, in a highly airtight state.

It is preferable in the first and second aspects of the invention that the foamed plastic is at least one resin selected from the group consisting of polystyrene resin, vinyl chloride resin, polyurethane resin, phenol resin, urea resin, epoxy resin, polyethylene resin, polypropylene resin, methacryl resin, and silicone resin, the material useful as foamed resin is obtained.

In the method of the invention, the foamed plastic of the first invention may be manufactured efficiently and rationally.

In a preferred constitution of the invention in which the foaming step is followed by the energy beam irradiating step and the step of depositing metal on the surface of the foamed plastic, the internal of the foams and the gap may be kept at a reduced pressure state for a long period of time.

According to another aspect of the invention, the foamed plastic of the second aspect of the invention may be manufactured efficiently and rationally.

In the preferred constitutions of the first and second aspects of the invention in which the polymerizable foaming agent contains unsaturated carbon bonding, the foaming agent is polymerized by irradiation with an energy beam to reduce the internal region of the foam and the gap after foaming.

As described herein, according to the invention, since the pressure inside the foams, and the gap region between the airtight film and the foamed plastic may be reduced, the soundproof and heat insulating effects of the foamed plastics may be improved.

DETAILED DESCRIPTION OF THE INVENTION

Figure 1A:
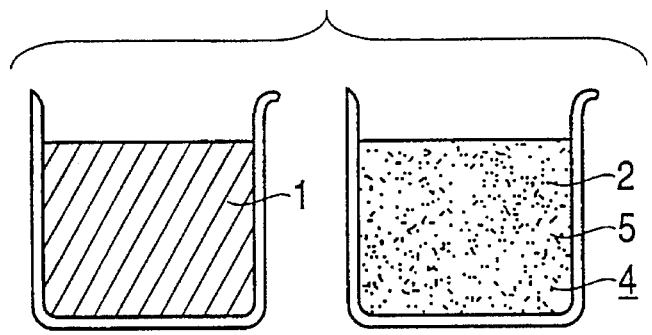
FIGS. 1(a) to (d) show a schematic process sectional view for explaining the manufacturing process of foamed polyurethane as example 2 of the invention.
Figure 1B:
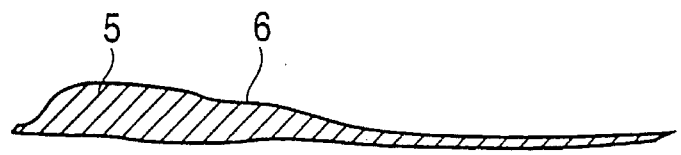

According to the first invention, the formed plastic of the invention has solved the problems of the prior art by using a foamed plastic. The heat insulation and soundproof performance are enhanced by using a volatile liquid polymerizable monomer as a foaming agent, irradiating with energy beam after foaming step to polymerize the foaming agent, and reducing pressure inside foams. Using, for example, $CF_2=CFOC_3F_7$ (bp. 35° C.) as a foaming agent mixed in a foam material, for example, polyol and irradiating with an energy beam such as electron beam, X-ray, γ-ray, ultra violet ray, etc., the foaming agent (polymerizable monomer) existing inside the independent foams containing in the foamed plastic is polymerized so that the soundproof and heat insulating effects of plastics such as foamed polyurethane may be enhanced.

The foamed plastic of the invention contains a volatile polymerizable foaming agent, and is manufactured by a method comprising a step of foaming by mixing the foaming agent and material plastic or resin, and a step of irradiating with an energy beam.

The second invention is further described below.

Before the foaming step and after deaerating and sealing the resin material in an airtight film, it may be also possible to foam and irradiate with the energy beam. Thus the polymerizable monomer is solidified, and the inside of the foams or gaps between the foamed plastic and airtight film can be reduced in pressure. In the manufacturing second method, a mixture of the foaming agent and the resin is initially sealed in an airtight film.

The foamed plastic of the invention may be roughly classified in two types. One is the foamed plastic alone, and the other is the the foamed plastic covered with an airtight film. The manufacturing method of foamed plastic alone comprises, using a volatile polymerizable monomer as a foaming agent, a step of foaming after mixing the foaming agent and plastic resin and a step of irradiating the foamed plastic with an energy beam to polymerize the foaming agent inside the foams, thereby producing a foamed plastic excellent in soundproof and heat insulating effects. The manufacturing method of the foamed plastic using an airtight film covering comprises, using a volatile liquid polymerizable monomer as a foaming agent, a step of hermetically sealing the mixture of the foaming agent and plastic resin with an airtight film, a step of foaming the mixture, and a step of irradiating the foamed plastic with an energy beam to polymerize the foaming agent existing in the foams and a gap region between the airtight film and the foamed plastic, thereby maintain a foamed plastic high in soundproof and heat insularing effects.

The manufacturing method of the foamable plastic is achieved by, for example, the suspension polymerize of a plastic material monomer containing a foaming agent, formed by the extrusion of foamable beads obtained by ordinary means such as impregnation or diffusion by setting pellets or spherical plastic and a diffusion solution containing the foaming agent in a pressure kiln, foaming by the extrusion of mixing the material plastic and the foaming agent, any other methods widely employed in this field.

As the plastic materials of the invention, thermoplastic resins or thermosetting resins may be used, and among these resins, for example, polystyrene, polyethylene, polyvinyl chloride, polyurethane, phenol resin, urea resin, epoxy resin, silicone resin and acrylic resin are particularly desired because they are applicable in wide fields. When using thermosetting resins, catalysts such as reaction promoters and reaction retarders may be used as required. For example, radical polymerization initiators such as benzoyl peroxide and azoisobutyronitrile which are known hardening catalysts may be preliminarily added to the foaming agent monomer or plastic material as the thermosetting catalyst for polymerizing the foaming agent monomer.

The foamed plastic of the invention is based on the technical concept of enhancing the heat insulating and soundproof effects by polymerizing the foams in the foaming agent so that the pressure in the internal region of the foamed plastic may be lower than the atmospheric pressure. Therefore, by using foaming agents having an unsaturated carbon bond such as a double bond group of carbon (C=C) or a triple bond group of carbon (C≡C) (ethynyl group), it is possible to polymerize and solidify easily by energy beam irradiation means or the like, which is very convenient. For example, the following compounds may be listed. In the following expressions, the boiling point is indicated in an abbreviated form of b.p.

(1) bp. 35° C.:$CF_2=CFOC_3F_7$ or $CHCl=CClF$
(2) bp. 30° C.:$CF_3CF_2CF_2CH=CH_2$ or $CF_2=CFI$
(3) bp. 40° C.:$CF_3COOCH=CH_2$
(4) bp. 54° C.:$CH_2=CHC_4H_9$
(5) bp. 63° C.:$CH_2=CHCH_2N(CH_3)_2$
(6) bp. 81° C.:$F(CF_2)_5CF=CF_2$
(7) bp. 73° C.:$CH_2=CHCF_2CF_2CH=CH_2$
(8) bp. 71° C.:$CCl_2=CClF$

These foaming agents may be used either alone or in combination. The foaming agent may be, needless to say, mixed together with an additive such as a foam shaping agent according to the conventional procedure.

Furthermore, when a metal is deposited on the surface of the foamed plastic, it is preferable because the heat radiation may be also reduced. As the metal material, for example, ordinary metal materials high in reflectivity such as aluminum and silver may be used.

As the airtight film for covering the foamed plastic of the invention, any highly airtight film may be used, for example, polyvinylidene chloride film polyethylene film, polyester film and polybutadiene film. It is more preferable when these films are laminates containing thermosensitive adhesive because the foamed plastic may be tightly sealed. It is moreover desired if the film is a metal deposition film by aluminum deposition, silver deposition or the like, or a film having metal foil such as aluminum foil and silver foil because the radiation heat may be reduced.

The term "independent foam type" comprehending a foam is divided completely at polymer resin, and the term "continuous foam type" comprehending each foams are continue in polymer resin. There is no doubt that the invention can use mixed independent foam type and continuous foam type.

The embodiments are sequentially described below. The first embodiment relates to the type of foamed plastic alone (independent foam type).

EXAMPLE 1

50 g of base polymer such as polyester based polyol with an average molecular weight of about 2000 produced by the condensation polymerization of adipic acid (or phthalic anhydride) and ethylene glycol (or propylene glycol, glycerin, trimethylol propane, etc.) or polyalkylene based ether polyl with an average molecular weight of about 2000 produced by the addition polymerization of ethylene oxide (or propylene oxide or butyrene oxide) and glycerin (or sorbitol), and 30 g of volatile foaming agent having an unsaturated group, such as $CF_2=CFOC_3F_7$ (b.p. 35° C.) were blended before hand to prepare 80 g of foaming hardening liquid, and then mixed futher with 60 g of a hardening agent such as a hexamethylene diisocyanate (commercial products include Crude MDI, Crude TDI, Prepolymer MDI, Prepolymer TDI of Asahi Glass Co., among others). Theoretically the mixing ratio of the alcohol group and isocyanage group should be nearly equimolecular. The mixture was immediately put into a forming container having with a gap of about 5 cm, then mixture was foamed by reaction heat because the boiling point of the foaming agent was 35° C., and was solidified in scores of seconds to several minutes, thereby producing foamed polyurethane (independent foam type).

Then the foamed urethane resin was taken out of the forming container, and irradiated with about 5 to 100 Mrads (preferably 10 to 20 Mrads) of electron beams accelerated to about 800 KeV. Electron rays were also transmitted sufficiently at a thickness was about 5 cm. By the irradiation, the $CF_2=CFOC_3F_7$ which was the volatile foaming agent with an unsaturated group in the independent foam was polymerized to form a solid polymer, and then the space in the independent foams were evacuated. At this time, meanwhile, by adding 1 g of benzoyl peroxide to 30 g of the $CF_2=CFOC_3F_7$, the $CF_2=CFOC_3F_7$ could be polymerized to a higher molecular weight.

Thus prepared foamed polyurethane was improved in the heat insulating characteristic about twice as compared with the material without electron ray irradiation. The soundproof effect was also improved about twice as much.

On the surface of thus obtained foamed urethane, when a metal of high heat ray reflection effect such as aluminum was vacuum deposited at around 1000 Angstroms (100 nm), the heat radiation was considerably reduced, and the heat insulating effect was further enhanced. Moreover, when irradiated with electron rays after sealing with an Al laminate film in a vacuum after foaming, the durability was enhanced together with the heat insulating effect.

Still more, by adding a surface active agent of several percent of dimethyl silocane as a foam shaping agent, the foam building force and foam stability were enhanced. To encourage the reaction of polyol and isocyanate, when a catalyst such as a tertiary amine (for example, pentamethyldietylene triamine) or organic tin (for example, dibutyl tin dilaurate) is added, resin formation is promoted.

In order to improve the properties, the polyol, hardening agent and foaming agent may be selected freely, or blends may be used. In particular, when using blended monomer with a few foaming agenta, a copolymer is produced by the irradiation, and the pressure reducing effect became larger.

When using a foaming agent of which the boiling point is around 60° C., after mixing the hardening agent containing polyol and the foaming agent, it is necessary to heat to about 100° C. for the formation.

EXAMPLE 2

In this embodiment, an example of the type having a covering of an airtight film is shown. As shown in FIG. 1, 50 g of base polymer such as polyester based polyol having average molecular weight of about 2000 produced by the condensation polymerization of adipic acid (or phthalic anhydride) and ethylene glycol (propylene glycol, glycerin, trimethylolpropane, etc.) or polyalkylene based ether polyol having average molecular weight of about 2000 produced by the addition polymerization of ethylene oxide (propylene oxide, butyrene oxide, etc.) and to glycerin (or sorbitol), 30 g of a volatile foaming agent 2 having an unsaturated group such as $CH_2=CHCH_2N$ $(CH_3)_2$(bp. 63° C.) [or, $F(CF_2)_5CF=CF_2$(bp. 81° C.), $CH_2=CHCF_2CF_2CH=CH_2$ (bp. 73° C.) or $CCl_2=CClF$ (bp. 71° C.)], and 5 g of calcium stearate were blended before hand to prepare 85 g of foaming hardening liquid, and then mixed further with 60 g of a hardening agent 3 such as hexamethylene diisocyanate (FIG. 1(a)), and the mixed solution 5 of polyol 1 and foaming hardening liquid 4 (theoretically mixing ratio of the alcohol group and isocyanate group should be nearly equimolecular) was immediately put into an Al laminate film 6 bag, and then that was deaerated and sealed (FIG. 1(b)).

Figure 1C:
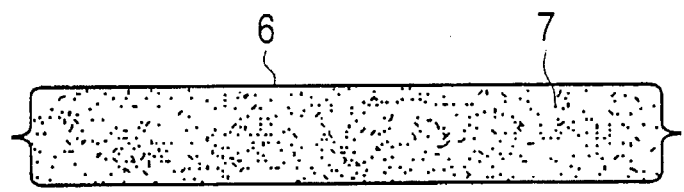

Then, gripping by a heating panel with a gap of about 5 cm and heating at about 100° C., the mixture was foamed and cured in several minutes, and continuous polyurethane type foam resin 7 was sealed hermetically to form a heat insulating material (FIG. 1(c)).

Later, the covered heat insulating material was taken out of the heating plate, and irradiated with about 20 Mrad of electron beam 8 accelerated to about 800 KeV, where as a thickness of that was about 5 cm, electron rays penetrated sufficiently. On the other hand, the volatile foaming agent $CH_2=CHCH_2N(CH_3)_2$ possessing the unsaturated group could be polymerized by the irradiation of electron rays, and the inside of the foams and the gap region were reduced in pressure while keeping the shape of the bag.

Figure 1D:
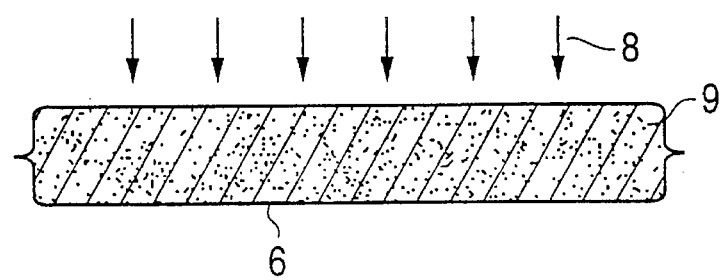

The foamed polyurethane insulating material 9 (FIG. 1(d)) prepared in this way was improved in the heat insulating characteristics by about three times as compared with the material without irradiation with electron rays. The soundproof effect was also improved about three times.

Aside from the above embodiments, a granular polystyrene resin (independent foam type) may be prepared by adding a volatile foaming agent possessing an unsaturated group, such as perfluoroheptene, to polystyrene, gripping the combination in heating plates heated at about 120° C. with a gap of about 5 cm, and foaming and curing for about scores of seconds to several minutes. By controlling the concentration of foaming agent in the resin and adding a surface active agent, the foamed polystyrene of independent foam type (many foams in the foamed polystyrene are separated with wall individually) or the foamed polystyrene of continuous foam type (many foams are connected with each other without wall) may be prepared as desired.

Taking out the foamed polystyrene from the heating plate by hand, and then irradiating the foamed polystyrene with about 10 to 100 Mrads of electron beams accelerated to about 800 KeV, at the thickness of about 5 cm, electron rays penetrated sufficiently, and the volatile foaming agent possessing unsaturated group such as perfluoroheptene in the independent foam type was polymerized by electron rays, so that the inside of the foams could be reduced in pressure.

By mixing the volatile foaming agent possessing the unsaturated group such as $CH_2=CHCF_2CF_2CH=CH_2$ in the vinyl chloride resin, and heating at about 200° C., foamed polyvinyl chloride of independent foam type is prepared. (By controlling the concentration of foaming agent in the resin and adding a surface active agent, either foamed polyvinyl chloride of independent foam type or foamed polyvinyl chloride of continuous foam type may be manufactured as desired.)

Taking out the foamed polyvinyl chloride from the heating plate by hand, and irradiating with about 10 to 100 Mrads of electron beams accelerated to about 800 KeV, the electron rays penetrate sufficiently, and the volatile foaming agent possessing unsaturated group of $CH_2=CHCF_2CF_2CH=CH_2$ in independent foams is polymerized with electron rays, so that the inside of the individual independent foams may be reduced in pressure.

Furthermore, by preliminarily preparing resol type condensate or novolak condensate, and mixing with the volatile foaming agent having an unsaturated group such as $CCl_2=CClF$ and putting in a mold, when heated to about 150° C., a foamed phenol resin of independent foam type is prepared. Similarly, at this time, by controlling the concentration of the foaming agent in the resin and adding surface active agent, either foamed phenol resin of independent foam type or foamed phenol resin of continuous foam type may be manufactured as desired.

Taking out the foamed phenol resin from the heating plate by hand, when irradiated with about 10 to 100 Mrads of electron beams accelerated at about 800 KeV, electron rays penetrate sufficiently, and volatile foaming agent possessing unsaturated group such as $CCl_2=CClF$ in independent foams is polymerized by electron rays, and the inside of the individual independent foams is reduced in pressure.

Aside from the resins used above, by using urea resin, epoxy resin, polyethylene or acrylic resin, needless to say, foamed plastics with high performance in heat insulation and soundproof effect may be similarly manufactured.

EXAMPLE 3

The same procedure as in Example 1 was repeated except that $CH_2=CHC_4H_9$ of b.p. of 54° C. was used as a foaming agent. In the foaming step, foaming by the reaction heat and curing in scores of seconds to several minutes were occurred, and foamed polyurethane of independent foam type was prepared.

Later, taking out the foamed urethane resin from the forming container, when irradiated with about 10 to 20 Mrads of electron ray beams accelerated at about 800 KeV, at a thickness of about 5 cm, electron rays penetrated sufficiently, and the volatile foaming agent $CH_2=CHC_4H_9$ possessing an unsaturated group in independent foams was polymerized by electron rays to be a polymer, and the inside of the individual independent foam was reduced in pressure.

In the prepared foamed polyurethane, as compared with the material without irradiation with electron rays, the heat insulating performance was improved about twice. The soundproof effect was also after improved about twice.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A method of manufacturing a foamed plastic comprising mixing and foaming a volatile polymerizable foaming agent and a resin to form a foamed mixture, and polymerizing the foaming agent by irradiating the foamed mixture with an energy beam, thereby reducing pressure inside the foamed plastic and enhancing heat insulating and soundproofing performance of the foamed plastic.

2. The method of manufacturing a foamed plastic according to claim 1, wherein metal is deposited on the surface of the foamed resin.

3. The method of manufacturing a foamed plastic according to claim 1, wherein the polymerizable foaming agent is a monomer having an unsaturated carbon bonding.

* * * * *